April 18, 1967 K. J. HECKER 3,315,032
LOW LIGHT LEVEL TELEVISION IMAGING SYSTEM FOR TRACKING, GUIDANCE, OR RECONNAISSANCE APPLICATION
Filed July 8, 1965
4 Sheets-Sheet 1

KLAUS J. HECKER
INVENTOR.
BY J. M. St. Amand
ATTORNEY

April 18, 1967 K. J. HECKER 3,315,032

LOW LIGHT LEVEL TELEVISION IMAGING SYSTEM FOR TRACKING, GUIDANCE, OR RECONNAISSANCE APPLICATION

Filed July 8, 1965

4 Sheets-Sheet 2

KLAUS J. HECKER
INVENTOR.

BY J. M. St. Amand

ATTORNEY

April 18, 1967 K. J. HECKER 3,315,032

LOW LIGHT LEVEL TELEVISION IMAGING SYSTEM FOR TRACKING, GUIDANCE, OR RECONNAISSANCE APPLICATION

Filed July 8, 1965 4 Sheets-Sheet 3

KLAUS J. HECKER
INVENTOR.

BY J. M. St. Amand
ATTORNEY

April 18, 1967

K. J. HECKER 3,315,032

LOW LIGHT LEVEL TELEVISION IMAGING SYSTEM FOR TRACKING, GUIDANCE, OR RECONNAISSANCE APPLICATION

Filed July 8, 1965

4 Sheets-Sheet 4

KLAUS J. HECKER
INVENTOR.

BY J. M. St. Amand
ATTORNEY

United States Patent Office 3,315,032

Patented Apr. 18, 1967

3,315,032

LOW LIGHT LEVEL TELEVISION IMAGING SYSTEM FOR TRACKING, GUIDANCE, OR RECONNAISSANCE APPLICATIONS

Klaus J. Hecker, Oberursel, Taunus, Germany, assignor to the United States of America as represented by the Secretary of the Navy Filed July 8, 1965, Ser. No. 472,079
7 Claims. (Cl. 178—6.8)

The invention herein described may be manufactured and used by or for the Government of the United States of America for governmental purposes without the payment of any royalties thereon or therefor.

The present invention relates to detection or guidance systems using television or a scanning type radiometer and more particularly to a low-light-level imaging system which can be used from a moving platform and permits integration of the signal from the scene over a substantially longer period of time than previous systems.

This invention is a continuation-in-part of U.S. patent application Ser. No. 274,394, filed Apr. 18, 1963.

In low-light-level television imaging systems it is desirable to integrate the signal over as long a period of time as possible. Since light itself is a noisy process, the signal-to-noise ratio of an ideal system will depend on the integration time. The light-level during a moonless night is so low that this quantum noise limits the obtainable image quality. Longer integration time will improve image quality. Systems are known which have a capability of integration over several seconds and for special purposes even over several minutes. However, none of the prior systems will permit the use of long integration time if the television camera is moving with respect to the scene since different elements or spots of the image will move on the faceplate of the image pickup tube and will cause smear preventing integration over a longer period of time. The present invention overcomes these objections to prior systems by providing a low-light-level television imaging system on a moving platform which permits integration of the signal over a longer period of time than heretofore.

It is an object of the invention therefore to provide a new and improved low-light-level television imaging system which can be used from a moving platform for detection and guidance purposes.

It is another object of the invention to provide an improved low-light-level television imaging system which can be used from a moving platform and permits integration of the signal from a scene over a substantially longer period than heretofore.

It is a further object of the invention to provide an improved electronic imaging system which can be used from a moving platform for reconnaissance or guidance purposes.

Other objects and many of the attendant advantages of this invention will become readily appreciated as the same becomes better understood by reference to the following detailed description when considered in connection with the accompanying drawings wherein.

Figure 1:
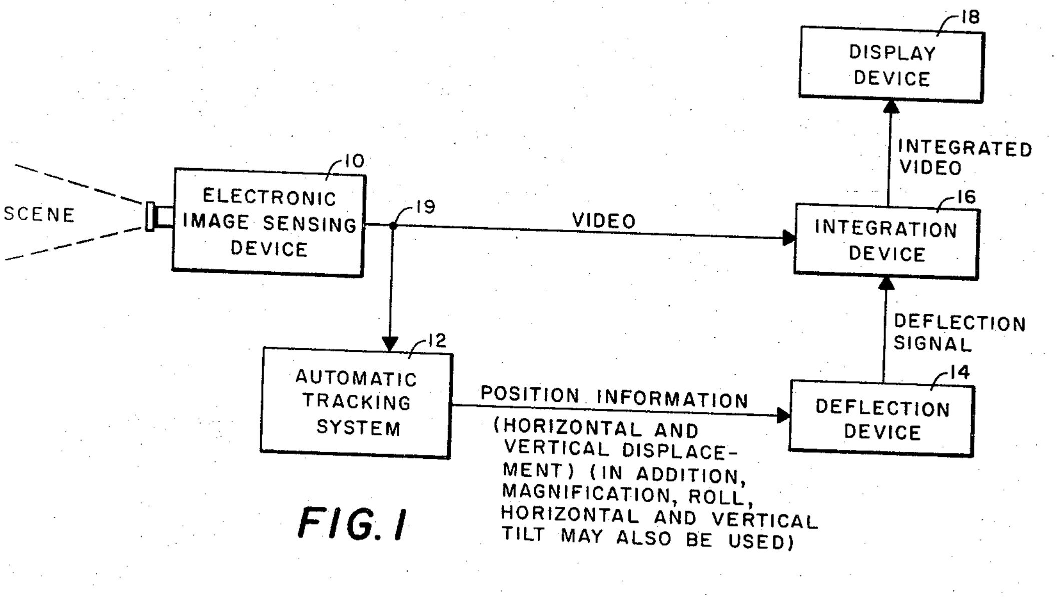
FIG. 1 shows a schematic block diagram of an embodiment of the present invention.

As shown in FIG. 1 of the drawings, an electronic image sensing device 10, such as a television camera using a low-light-level television pickup tube, or a scanning type radiometer, is connected to an automatic tracking system 12, for example, such as the type shown and disclosed in copending application Ser. No. 79,469 of Frederick C. Alpers, filed Dec. 29, 1960 for Television Target Tracking System, which provides information about the motion of one particular spot in two degrees of freedom (horizontal and vertical displacement, or as in U.S. Patent No. 2,970,187 which also discloses an automatic tracking device for providing information about one particular spot in two degrees of freedom); and, if several high contrast spots (fixed in relation to each other) are always present in the scene being imaged on the pickup tube of image sensing device 10, several point-tracking systems can be used to track these spots. This can be done by dividing the received image, as viewed by the television camera in the image sensing device, into four quadrants and providing a tracker as in copending application Ser. No. 79,469 or U.S. Patent No. 2,970,187 for a bright area or spot in each quadrant, whereby the bright spots are fixed with respect to each other in the scene, but which move on the face plate of the device due to camera motions. In other words, where more than one point-tracker is used as in this case, the same pickup tube in the image sensing device is used for all the trackers, but each tracker will use image information (i.e., video signals) from a different section or quadrant of the overall received image. The output of the trackers provide a necessary horizontal and vertical error signals ($\Delta L$, $\Delta H$), which are added in the manner shown in the hereinafter described "Simplified Analysis." From the position information of these high contrast spots it is possible to compute values which correspond to as many as six degrees of freedom of motion (i.e. horizontal displacement, vertical displacement, displacement along the camera optical axis (e.g., magnification), roll, tilt in the horizontal, tilt in the vertical) by means of simple well known analog adders (See, Electronic Analog Computers by G. A. Korn, McGraw-Hill, 1952, pp. 10–14.). Since fixed spots (i.e., the spots are bright areas in the scene which do not move relative to each other) in a scene will change their position on a two dimensional image as a function of the six degrees of freedom of motion of the camera 10, it is possible to compute the values for all six degrees of freedom if the two dimensional motion of several spots is known. This is shown in the following "Simplified Analysis." The tracker in each quadrant provides the two dimensional error. These errors are then added according to the six equations shown in the "Simplified Analysis" for the quantities $I_X$, $I_Y$, $I_R$, $I_M$, $I_{TX}$ and $I_{TY}$.

SIMPLIFIED ANALYSIS

Figure 2:
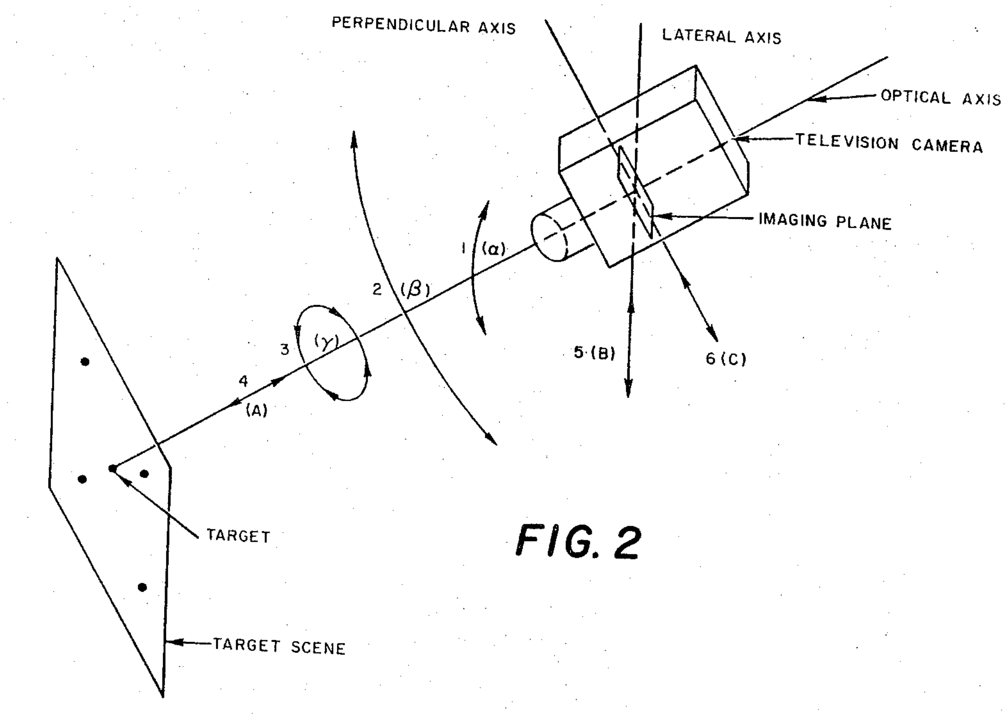
FIG. 2 shows a camera/target scene relationship assumed for simplified analysis.

*Definitions.*—The electro-optical or television camera, which is movable in all six degrees of freedom, is shown in FIG. 2 in the position in which its optical axis is aligned with the point identified as "target" on the plane surface identified as "target scene." For simplification, the target scene is taken to be parallel to the image plane. In the following discussion, the term "vertical plane" refers to the vertical plane which includes the optical axis, and the term "vertical plane" refers to the vertical plane which includes the optical axis, and the term "lateral plane" refers to a plane which includes the optical axis and is normal to the vertical plane. The term "perpendicular axis" refers to the line of intersection between the vertical plane and the imaging plane, and the term "lateral axis" refers to the line of intersection between the lateral plane and the imaging plane. These two axes are perpendicular both to each other and to the optical axis.

The six possible motions of the television camera, which are identified in FIG. 2 both by numbers and by the symbols used to represent the values of the specific motions, are defined as follows:

(1) Rotation of the camera about the perpendicular axis
(2) Rotation of the camera about the lateral axis
(3) Rotation of the camera about the optical axis
(4) Translational motion of the camera toward or away from the target scene (translation along the optical axis)
(5) Translational motion of the camera along the lateral axis
(6) Translational motion of the camera along the perpendicular axis It may be noted that, since angular motion is involved in motions 1, 2, and 3, these motions can occur rather rapidly, while the translational motions 4, 5, and 6 are limited in speed and magnitude by the speed and magnitude with which such motions can be executed by the platform carrying the television camera.

As shown in FIG. 2, four points are placed symmetrically about the target point on the plane representing the target scene. When the target scene is viewed by the camera and the camera is moved in any of the six degrees of freedom, the resulting motion of each of the four points may be taken as indicating the direction (though not the magnitude) of the motion of all points in the quadrant represented by that point. In the following analysis, observations are made of the changes in the positions of the points in both the lateral (L) and perpendicular (H) directions which result from motions of the camera in each degree of freedom, and certain expressions are derived which represent the sums of the ΔL's and the ΔH's that result from each motion. In the interest of clarity, the terms for direction (right/left, up/down, clockwise/counterclockwise) are used with reference to the motion of the points as seen by the camera, rather than the motions of the camera itself. Movements of the points to the right and upward are defined as positive, and movements to the left and downward are defined as negative. A number of quantities designated I are defined by the following equations:

$$I_X=(\Delta L_1+\Delta L_2+\Delta L_3+\Delta L_4)$$
$$I_Y=(\Delta H_1+\Delta H_2+\Delta H_3+\Delta H_4)$$
$$I_R=(\Delta L_1+\Delta L_2-\Delta L_3-\Delta L_4)-(\Delta H_1-\Delta H_2-\Delta H_3+\Delta H_4)$$
$$I_M=(\Delta L_1-\Delta L_2-\Delta L_3+\Delta L_4)+(\Delta H_1+\Delta H_2-\Delta H_3-\Delta H_4)$$
$$I_{TX}=-(\Delta H_1-\Delta H_2+\Delta H_3-\Delta H_4)$$
$$I_{TY}=-(\Delta L_1-\Delta L_2+\Delta L_3-\Delta L_4)$$

The numerical subscripts used refer to quantities diagrammed in FIGS. 3 through 6. The quantities $I_X$, $I_Y$, $I_R$, $I_M$, $I_{TX}$ and $I_{TY}$ represent the X-shift error signal, Y-shift error signal, roll error signal, magnification error signal, X-tilt signal and Y-tilt signal, respectively, as hereinafter described in more detail.

Figure 3:
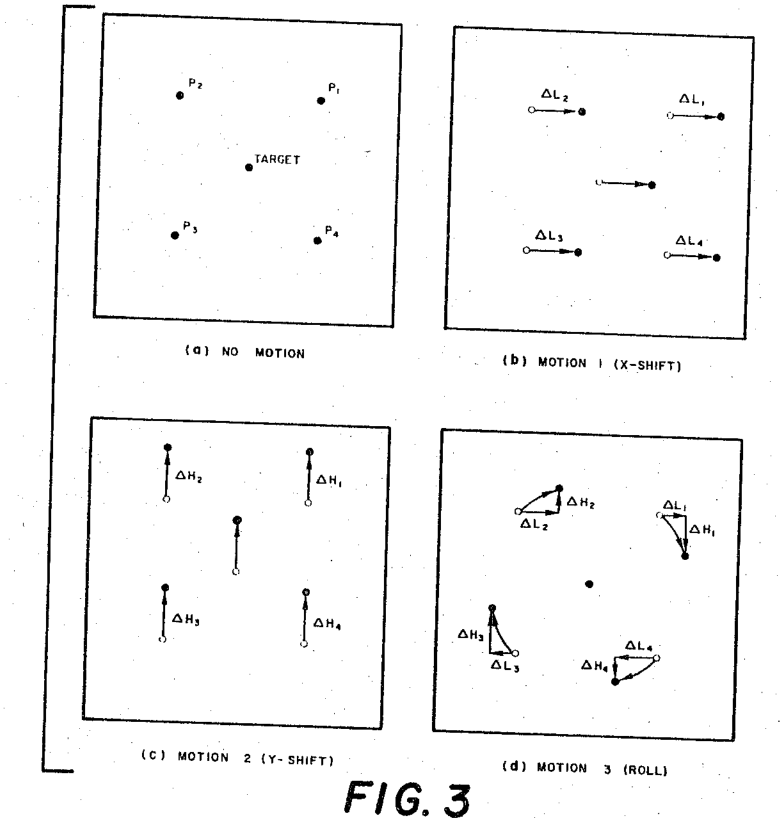
FIG. 3 illustrates changes in image of target scene resulting from angular motions of the television camera.

*Angular Motions*.—FIG. 3(*a*) shows the image of the target scene obtained when the camera is in perfect alignment with the target, and FIG. 3(*b*), 3(*c*), and 3(*d*) show the changes in the positions of the target point and the other four points ($P_1$, $P_2$, $P_3$, and $P_4$) which result from motions of the camera in the three angular degrees of freedom. In each case, the effect is shown of motion in only one of the two possible directions (right/left, up/down, clockwise/counterclockwise), since motion in the opposite direction would produce effects corresponding to those for the direction shown. In each case, the specific motion represented is the one which is defined as positive.

When the camera is moved by an angle α through motion 1 (rotation about its perpendicular axis), the image of the target scene changes in the manner shown in FIG. 3(*b*). There is no motion in the vertical (i.e., $$\Delta H_1=\Delta H_2=\Delta_3=\Delta_4=0)$$

while the lateral motions of all four points are equal and are a function of α; that is, $$\Delta L_1=\Delta L_2=\Delta L_3=\Delta L_4=f(\alpha)$$

Use of this result in the six sum equations yields $$I_X=4f(\alpha)$$

and $$I_Y=I_R=I_M=I_{TX}=I_{TY}=0$$

Since the ΔL's vanish when the camera is not moved at all, it must be true that, when $\alpha=0$, then $0=f(0)$. Since $f(\alpha)$ cannot be a step function, it can be concluded that at least for small values of α, $I_x$ must be proportional to α. The signal representing the value of $I_x$ is the X-shift error signal; this signal is one of the two output signals of the system (it is also used within the system both to stabilize the camera in yaw and to adjust the reference image).

When the camera is moved by an angle β through motion 2 (rotation about its lateral axis), the image of the target scene changes in the manner shown in FIG. 3(*c*). By a process similar to that followed above in considering motion 1, it can be concluded that, for small values of β, $I_Y$ must be proportional to β. The signal representing the value of $I_Y$ is the Y-shift error signal; this signal is the second of the two output signals of the system (it is also used within the system both to stabilize the camera in pitch and to adjust the reference image).

When the camera is moved by an angle γ through motion 3 (rotation about the optical axis), the image of the target scene changes in the manner shown in FIG. 3(*d*). These changes are much more complex than those resulting from motions 1 and 2, since they involve simultaneous motion in the lateral and perpendicular directions, and the vectors of the points are no longer identical. However, the corresponding lateral and perpendicular motion vectors of points 1 and 3 and the corresponding lateral and perpendicular vectors of points 2 and 4 are equal in magnitude, though opposite in sign, and also the lateral vector of point 1 equals in magnitude the perpendicular vector of point 2, etc. Hence, $$\Delta L_1=-\Delta L_3=\Delta H_2=-\Delta H_4$$
$$\Delta H_1=-\Delta H_3=-\Delta L_2=+\Delta L_4$$

Use of these results in the six sum equations leads to a situation in which all equations reduce to zero except the two involving $I_R$ and $I_M$. However, considerations beyond the intended scope of this discussion and involving more than four points indicate that it is reasonable to assume that $I_M$ also reduces to zero. The conclusion is then that, for small values of γ, $I_R$ is proportional to γ. The signal representing the value of $I_R$ is the roll error signal (it is also used both to stabilize the camera in roll and to adjust the reference image).

Figures 4, 9:
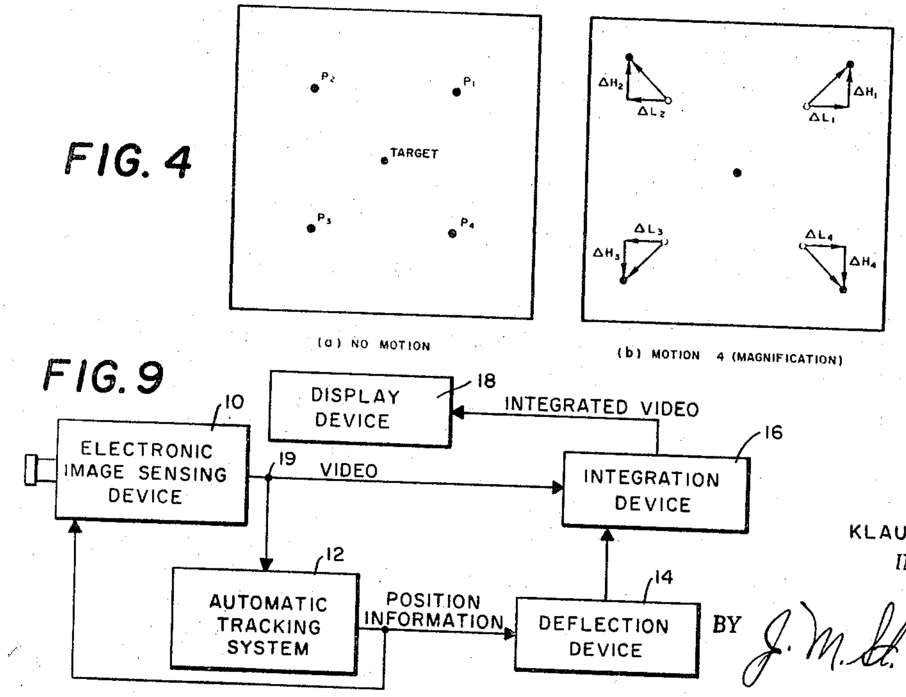
FIG. 4 illustrates changes in image of target scene resulting from translational motion of camera toward target.
FIG. 9 shows an embodiment of the invention similar to that of FIG. 1, but wherein position information is fed to a servo in the camera device.

*Translational Motions*.—When the camera is moved by a distance A through motion 4 (translational motion toward the target), the image of the target scene changes in the manner shown in FIG. 4(*b*). In this case, all eight vector components are equal in magnitude, but the lateral vector components of points 1 and 4 opposite in sign from those of points 2 and 3, and the vertical vector components of points 1 and 2 are opposite in sign from those of points 3 and 4:

$$\Delta L_1=\Delta L_4=-\Delta L_2=-\Delta L_3$$
$$\Delta H_1=\Delta H_2=-\Delta H_3=-\Delta H_4$$

When these results are used in the six sum equations, all of the sums are found to equal zero except $I_M$, which is found to be proportional to A. The signal representing the value of $I_M$ is the magnification error signal (it is also used to adjust the size of the reference image).

Figure 5:
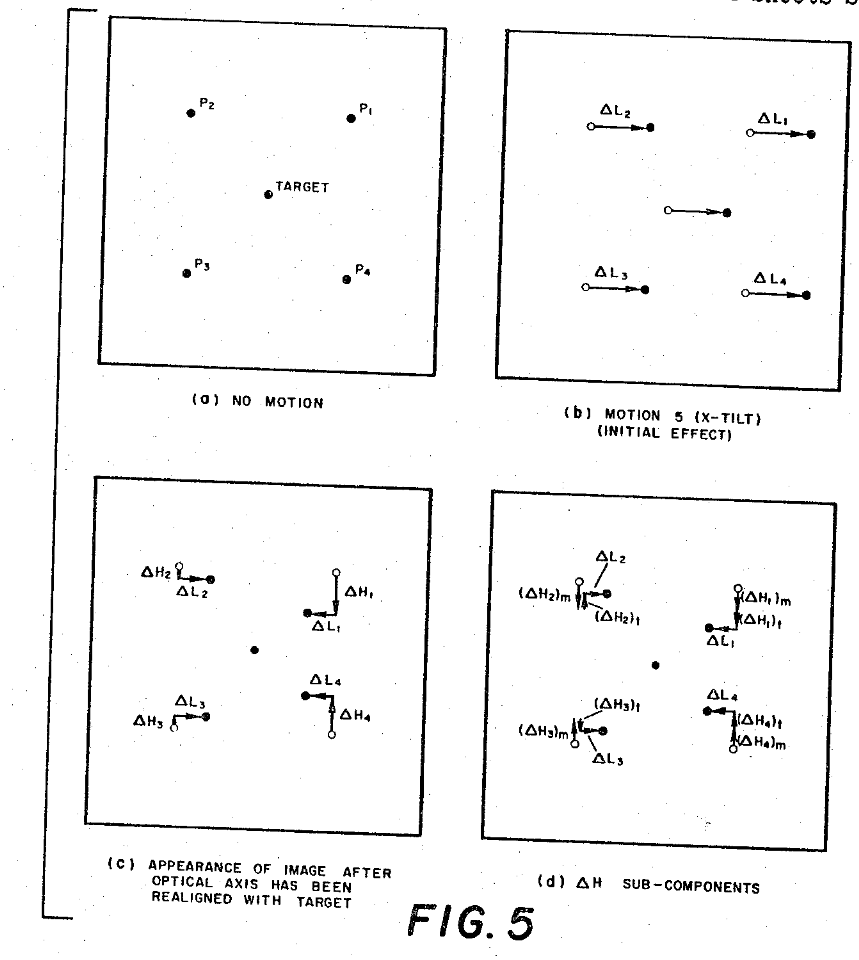
FIG. 5 illustrates changes in image of target scene resulting from translational motion of camera along lateral axis.

When the camera is moved by a distance B through motion 5 (translation of the camera along the lateral axis), the image of the target scene changes in a manner approximating that shown in FIG. 5(*b*). A comparison of FIG. 5(*b*) with FIG. 3(*b*) shows that the changes resulting from translational motion 5 are very similar to those resulting from the angular motion 1. As explained above, the signal resulting from this angular motion ($I_X$) is used to stabilize the camera in yaw. Consequently, the error signal resulting from translational motion 5 will first return the optical axis to the line of sight to the target, resulting in an image like that shown in FIG. 5(*c*). Since the distance to the target has changed, the target image will have a different size, and it is necessary to adjust the electron beam in integration device 16 accordingly. In addition, the four points originally located at the corners of a square are now located at the corners of a trapezoid, and additional adjustment of the electron beam in the integration device in this respect is required.

The lateral components of all vectors in FIG. 5(*c*) are approximately of equal magnitude, but those of points 1 and 4 are opposite in sign from those of points 2 and 3; the vertical components of points 1 and 4 are of equal magnitude but opposite sign, and the vertical components of points 2 and 3 are of equal magnitude and also of opposite sign. As shown in FIG. 5(*d*), each vertical component actually consists of two sub-components. All of the sub-components $(\Delta H)_m$ are of equal magnitude, but $(\Delta H_1)_m$ and $(\Delta H_2)_m$ are of opposite sign from $(\Delta H_3)_m$ and $(\Delta H_4)_m$; and all the sub-components $(\Delta H)_t$ are of equal magnitude, but $(\Delta H_1)_t$ and $(\Delta H_3)_t$ are of opposite sign from $(\Delta H_2)_t$ and $(\Delta H_4)_t$. If these values are applied to the six sums, we obtain $$I_X=I_Y=I_R=I_{TY}=0$$

and $$I_M=(\Delta L_1+\Delta L_2+\Delta L_3+\Delta L_4)+[(\Delta H_1)_m+(\Delta H_2)_m+(\Delta H_3)_m+(\Delta H_4)_m]$$
$$I_{TX}=-[(\Delta H_1)_t+(\Delta H_2)_t+(\Delta H_3)_t+(\Delta H_4)_t]$$

Both sums must be in a first approximation proportional to B. (The signal representing the value of $I_M$ is used to adjust the electron beam in integration device 16.) The signal representing the value of $I_{TX}$ is identified as the X-tilt signal (it is used to adjust the electron beam in the integration device in such a manner as to cancel the trapezoidal distortion encountered in motion 5.) In the equations for $I_{TX}$ and also for $I_{TY}$, the sums are taken as negative in order to obtain positive error signals for positive motions along the X and Y axes.

Figure 6:
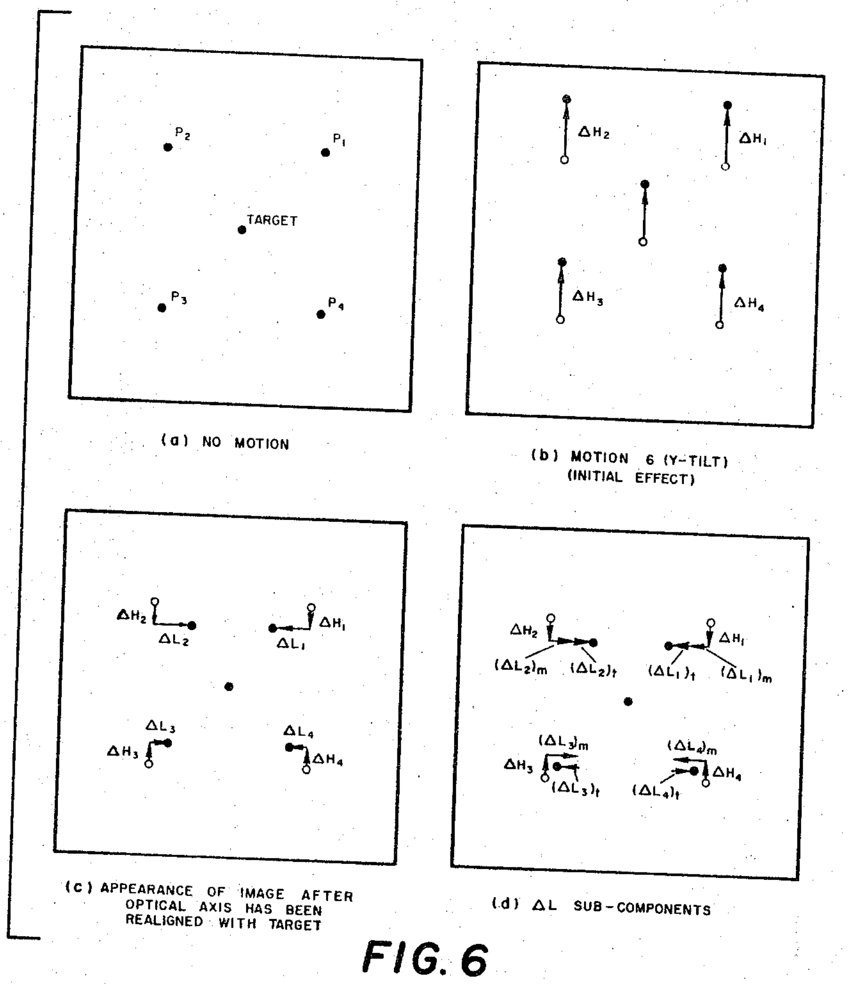
FIG. 6 illustrates changes in image of target scene resulting from translational motion of camera along perpendicular axis.

When the camera is moved by a distance C through motion 6 (translation of the camera along the perpendicular axis), the image of the target scene changes in the manner shown in FIG. 6(*b*). It will be seen that motion 6 affects the image of the target scene in a way that is very similar to the effect of motion 5, except that the camera motion occurs in the vertical plane and the motion of the points is interchanged between the lateral and the vertical dimension. The signal representing the value of $I_{TY}$ is identified as the Y-tilt signal (it is used to adjust the electron beam in integration device 16 in such a manner as to cancel the trapezoidal distortion encountered in motion 6).

Depending on the particular application, which determines the relative motion of the television camera 10 to the scene and the desired integration time, two-degreeof-freedom (horizontal and vertical displacement) information may be sufficient. If there is large relative motion of the camera to the scene or a relatively long integration time is desired, information of more than two degrees of freedom may be required, such as roll, magnification, horizontal and vertical tilt, in addition to the horizontal and vertical displacement, from several point-trackers in automatic tracking system 12 as aforementioned.

The information obtained from the automatic tracking system 12 is used in a deflection device 14 which adjusts the electron beam in an integration device 16 with respect to the electron beam in the low-light television camera sensing device 10 at any instant in such a manner that resolution elements corresponding to the same spot on the scene are hit by respective electron beams in both devices. In other words, if the low-light-level television camera image shifts to one side, the raster in integration device 16 is shifted in a similar manner in the opposite direction to correct for (or cancel) the image motion. Deflection system 14 merely uses well known circuits, for example, of the type used in oscilloscopes, television monitors, radar displays and the like for beam deflection. Conventional television rasters are generated by line and field deflection generators which make use of devices such as blocking oscillators, multi-vibrators, saw-tooth generators, etc. The deflection signal generated in deflection device 14 is generated by devices of this type whose amplitude levels and phase are controlled by the position information received from automatic tracking system 12. For example, the axial displacement signal (e.g., magnification) controls the amplitude of both line and field deflection generators; the horizontal and vertical displacement signals simply control the average D.C. level at line and field deflection outputs. The deflection system 14, for example can use typical beam deflection circuits as described in Theory and Design of Television Receivers by Sid Deutch, McGraw-Hill, (1951) pp. 383 and 394, and when desired to change the size (i.e., magnification) or centering (i.e., shift error) of the raster, adjustment of size and centering controls can be performed by well known means, such as with servo mechanisms as described in Principles of Radar, 2nd ed., McGraw-Hill, (1946) pp. 12–30 and 12–31. The six error signals are used in the deflector generator to change the deflection accordingly. For instance, if the error signal output of the tracking system 12 indicates a shift error, the deflection will be shifted accordingly. If the output of the tracking system indicates a magnification error signal (FIG. 4*b*), the amplitude of the deflection signals would be changed accordingly as a function of the error signals. Also, another method for performing the function of deflection device 14 is set forth in copending patent application Ser. No. 470,649 filed July 8, 1965, by Klaus J. Hecker, Hans Staeudle and Werner G. Hueber for Controllable Television Raster Generator.

The video signal is then integrated by integration device 16 over several frames of the low-light-level television camera 10 continuously adjusting the raster in the integration device until the desired integrated image results. Integration device 16 may merely use an electron recording storage tube, such as Raytheon CK 7571/QK685 which is well known to be capable of integration of signals, in a well known manner for integrating. If such a tube is used, for example, the deflection signal from deflection device 14 would be fed to the horizontal and vertical magnetic deflection yokes of the tube. Such a tube is capable of non-simultaneous read or write operation. Therefore, it is necessary to alternate between integration and display. Alternately, a storage tube sometimes known as a scan converter, of the type such as Raytheon CK 7702, capable of simultaneously read and write, may be used, thus not requiring alternation between integration and display. Such an integration device is described in Advances in Electronics and Electron Physics, Vol. XVI, by L. Marton, Academic Press, 1962, p. 267.

The integrated image signal can then be fed to a display device 18, such as a standard television monitor. The displayed image is identical to an image obtained in a long integration television system which does not move with respect to the scene. It can be viewed by a human operator, if desired, who uses the information for navigation, target detection or missile guidance. If desired, as shown in FIG. 9, the position information from automatic tracking system 12 can also be fed back to a servo means such as disclosed in U.S. Patent No. 3,057,953 in television camera 10 in order to have the television camera's optical axis continuously point substantially at the same spot of a particular scene.

Figure 7:
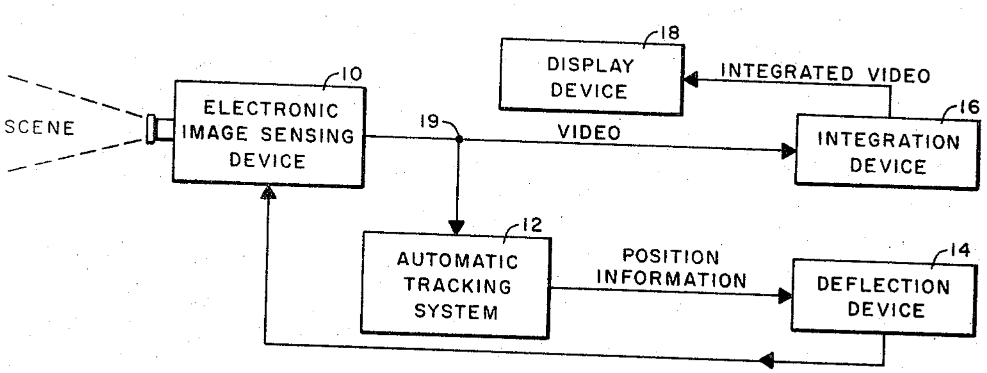
FIG. 7 is a schematic block diagram, as in FIG. 1, with the exception that the deflection signal is fed to the electronic image sensing device instead of to the integration device.

The deflection signal from deflection device 14 could be fed to television camera 10, as shown in FIG. 7, instead of integration device 16 to adjust the electron beam in the television camera with respect to the electron beam in the integration device at any instant in such a manner that resolution elements corresponding to the same spot on the scene are hit by respective electron beams in both devices. In such case integration device 16 would, of course, have a conventional deflection system of its own.

Figure 8:
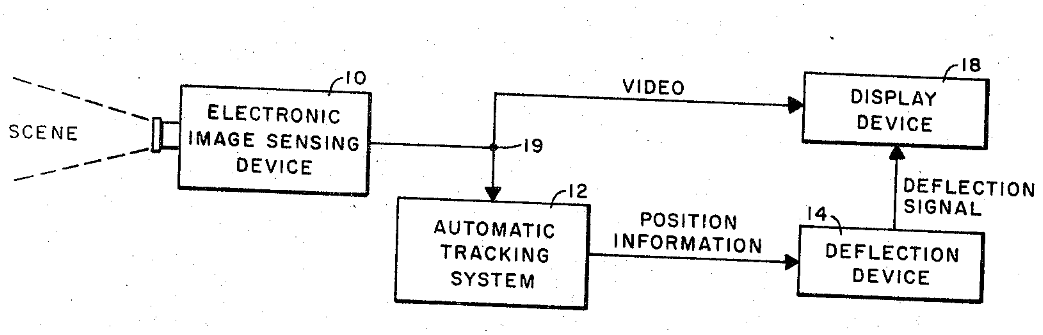
FIG. 8 is a schematic block diagram, like FIG. 1, but with video and deflection signals fed directly to the display device.

Several alternate methods can be used. It is possible to do the integration in the phosphor of display device 18, thus eliminating block 16 in FIG. 1, as shown in FIG. 8 of the drawings. As shown in FIG. 8, deflection signals from deflection device 14, which is controlled by the two to six degrees of freedom information from automatic tracking system 12 is fed to display device 18. A long persistance phosphor in the display device 18 integrates consecutive frames; this type of integrating is well known in the art. Using this type display device, the video signal may also be fed directly to display device 18 in FIG. 2.

This invention should not be restricted to systems which merely make use of a display device since it can be used anywhere a video signal from an integrated image is required. This integrated video signal is obtained at the output of integration device 16, as shown in FIGS. 1 and 7.

An automatic tracking system of the area correlation type with quadrant gating to divide the image in four quadrants and to obtain error signals separately from each quadrant may be a more desirable system since this does not require the above mentioned bright spots in the scene. Area correlators integrate the obtained information over the whole scene and consequently are capable of tracking at very low signal-to-noise ratios.

For a reconnaissance system photographic coverage may be required. In such a case it would be possible to integrate directly in the photographic film. In this system, which is like that of FIG. 3, a standard display tube would be used and the picture from this display, would be focused onto a photographic plate or film. As long as the same plate or film is exposed, integration takes place.

The use of the present invention is not restricted to low-light-level television. It can also be used with a scanning type radiometer as the electronic image sensing device 10 located on a moving platform.

In certain applications it may be desirable to locate some portions of the system in a missile and have the other portions in an aircraft. Depending on which portion of the system is located in the missile and which part is in the aircraft, different data links are required.

In the case of a reconnaissance drone system, a continuous recording of the image may be obtained at point 19 from the television camera 10 (or a low-light-level image intensifier) carried in a reconnaissance drone, other portions of the system shown in the figures of drawing being ground based. After the drone returns to its base, the recording can then be played back through the remainder of the described system (from point 19 on)

in order to permit compensation of image motion and integration.

Obviously many modifications and variations of the present invention are possible in the light of the above teachings. It is therefore to be understood that within the scope of the appended claims the invention may be practiced otherwise than as specifically described.

What is claimed is:

1. A low-light-level television imaging system which can be used from a moving platform and which permits integration of the signal from a scene over a substantially long period of time, comprising:

(a) a television camera using a low-light-level pickup tube having an electron beam for scanning an image of a scene viewed by said television camera, (b) automatic tracking means including at least one point-tracker being connected to said television camera for point tracking of at least one high contrast spot present in the scene viewed by said television camera, each said at least one point-tracker producing an error signal corresponding to two dimensional motion of the high contrast spot tracked thereby, said automatic tracking means also including analog adding means for computing position information values corresponding to degrees of freedom of motion of the television camera with respect to the scene being viewed thereby from the two dimensional error signals of said at least one point-tracker, said position information being available as signals at the output of said automatic tracking means, (c) integration means having an adjustable electron beam also being connected to said television camera for integrating video signals of the scene being viewed by said television camera, the electron beam in said integration means being adjusted until a desired integrated image results, (d) deflection means including line and field deflection generators for generating a deflection signal being connected to the output of said automatic tracking means for receiving position information signals therefrom and also being connected to said integration means, the amplitude and phase of the deflection signal generated by said deflection means being controlled in response to position information signals from said automatic tracking means, said deflection signal being fed to said integration means for adjusting the electron beam in said integration means with respect to the electron beam in the television camera at any instant such that resolution elements corresponding to the same spot on the scene are hit by the respective electron beams in both the integration means and television camera, whereby when the image of the scene being viewed by the television camera shifts, the electron beam in said integration means will shift in an opposite direction to correct for image motion, results, (e) said integrated image being obtained from an integrated video signal at the output of said integration means for use where a video signal from an integrated image is required.

2. A system as in claim 1 wherein said integrated video signal is fed to a display means for viewing.

3. A system as in claim 1 wherein said television camera includes servo means and information from said automatic tracking means is also fed back to said television camera servo means for continuously pointing the optical axis of the camera at substantially the same spot of a particular scene.

4. A system as in claim 1 wherein said integration means includes a long persistence phosphor display device where consecutive frames of the scene being viewed are integrated.

5. A low-light-level television imaging system which can be used from a moving platform and which permits integration of the signal from a scene over a substantially long period of time, comprising:

(a) a television camera using a low-light-level pickup tube having an electron beam for scanning an image of a scene viewed by said television camera, (b) automatic tracking means connected to said television camera, said automatic tracking means including at least one point-tracker and analog adding means, said at least one point tracker tracking at least one high contrast spot present in the scene viewed by said television camera, each said at least one point-tracker producing an error signal corresponding to two dimensional motion of the high contrast spot tracked thereby, said analog adding means computing position information values corresponding to degrees of freedom of motion in horizontal and vertical displacement, displacement along the optical axis, roll, and horizontal and vertical tilt of the television camera with respect to the scene being viewed thereby from the two dimensional error signals of said at least one point-tracker, said position information being available as signals at the output of said automatic tracking means, (c) integration means having an adjustable electron beam being connected to said television camera for integrating video signals of the scene being viewed by said television camera, (d) deflection means including line and field deflection generators for generating a deflection signal being connected to the output of said automatic tracking means for receiving position information signals therefrom and also being connected to said television camera, the amplitude and phase of the deflection signal generated by said deflection means being controlled in response to position information signals from said automatic tracking means fed to said deflection means, the deflection signal from said deflection means being fed to said television camera to adjust the electron beam in said television camera with respect to the electron beam in the integration device at any instant and in such a manner that resolution elements corresponding to the same spot on the scene are hit by respective electron beams in both the television camera and the integration means.

6. A low-light-level television imaging system which can be used from a moving platform and which permits integration of the signal from a scene over a substantially long period of time, comprising:

(a) a television camera using a low-light-level pickup tube having an electron beam for scanning an image of a scene viewed by said television camera, (b) automatic tracking means including at least one point-tracker being connected to said television camera for point tracking of at least one high contrast spot present in the scene viewed by said television camera, each said at least one point-tracker producing an error signal corresponding to two dimensional motion of the high contrast spot tracked thereby, said automatic tracking means also including analog adding means for computing position information values corresponding to degrees of freedom of motion of the television camera with respect to the scene being viewed thereby from the two dimensional error signals of said at least one point-tracker, said position information being available as signals at the output of said automatic tracking means, (c) a display means having an adjustable electron beam connected to said television camera for receiving video signals from said television camera, (d) deflection means including line and field deflection generators for generating a deflection signal being connected to the output of said automatic tracking means for receiving position information signals therefrom and also being connected to said display means, the amplitude and phase of the deflection signal generated by said deflection means being controlled in response to position information signals from said automatic tracking means, said deflection signal being fed to said display means for adjusting the electron beam in said display means with respect to the electron beam in the television camera at any instant such that resolution elements corresponding to the same spot on the scene are hit by respective electron beams in both the display means and television camera, whereby the said video signal from the television camera is integrated by said display means continuously adjusting the raster therein until a desired integrated image results, (e) said integrated image being obtained from the integrated signal as said display means.

7. A system as in claim 6 wherein said display means comprises a long persistence phosphor display device where consecutive frames of the scene are integrated.

References Cited by the Examiner

UNITED STATES PATENTS

| | | | |
|---|---|---|---|
| 2,403,975 | 7/1946 | Graham | 178—6.8 |
| 2,738,494 | 3/1956 | Horrell | 178—6.8 X |
| 2,774,964 | 12/1956 | Baker et al. | 178—6.8 X |
| 2,912,494 | 11/1959 | Flint | 178—6.8 |
| 2,970,187 | 1/1961 | Hinton | 178—6.8 |
| 3,046,332 | 7/1962 | Engler | 178—6.8 X |
| 3,057,953 | 10/1962 | Guerth | 178—6.8 |
| 3,082,294 | 3/1963 | Dean | 178—6.8 |
| 3,153,699 | 10/1964 | Plass | 178—6.8 |
| 3,175,089 | 3/1965 | Talley et al. | 178—6.8 X |
| 3,257,505 | 6/1966 | Van Wechel | 178—6.8 |
| 3,290,506 | 12/1966 | Bertram | 250—203 |

DAVID G. REDINBAUGH, *Primary Examiner.*

CHESTER L. JUSTUS, *Examiner.*

G. M. FISHER, R. L. RICHARDSON, *Assistant Examiners.*